Feb. 14, 1956 A. W. MILLS ET AL 2,734,610
DRIVE MECHANISM FOR PAPER FEEDING DEVICE
Original Filed Aug. 9, 1945 6 Sheets-Sheet 4
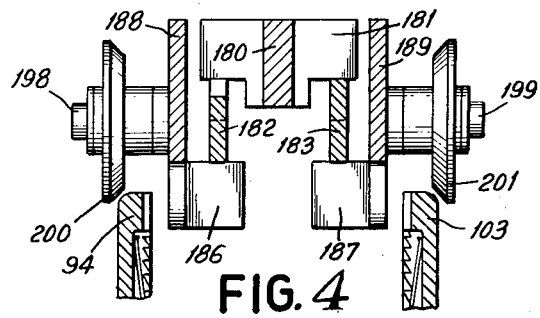
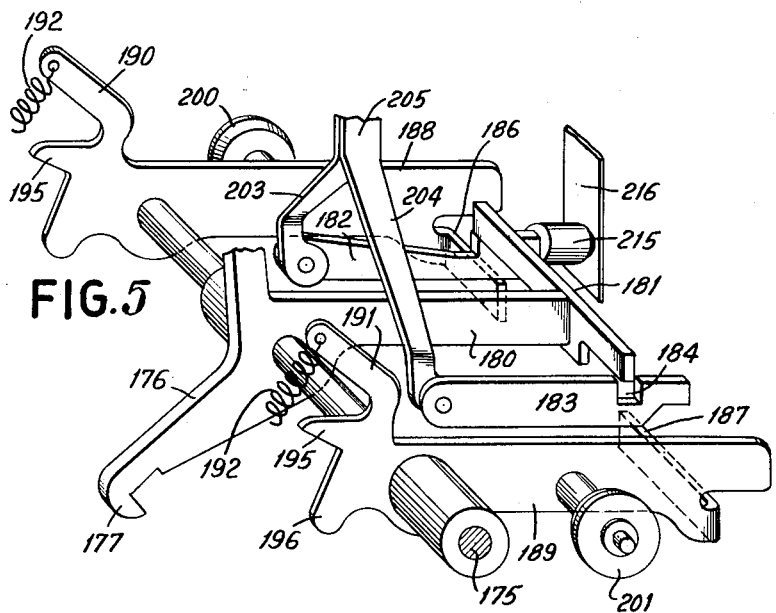
INVENTORS
A. W. MILLS
F. J. FURMAN
BY E. J. RABENDA
J. W. Armbruster
ATTORNEY

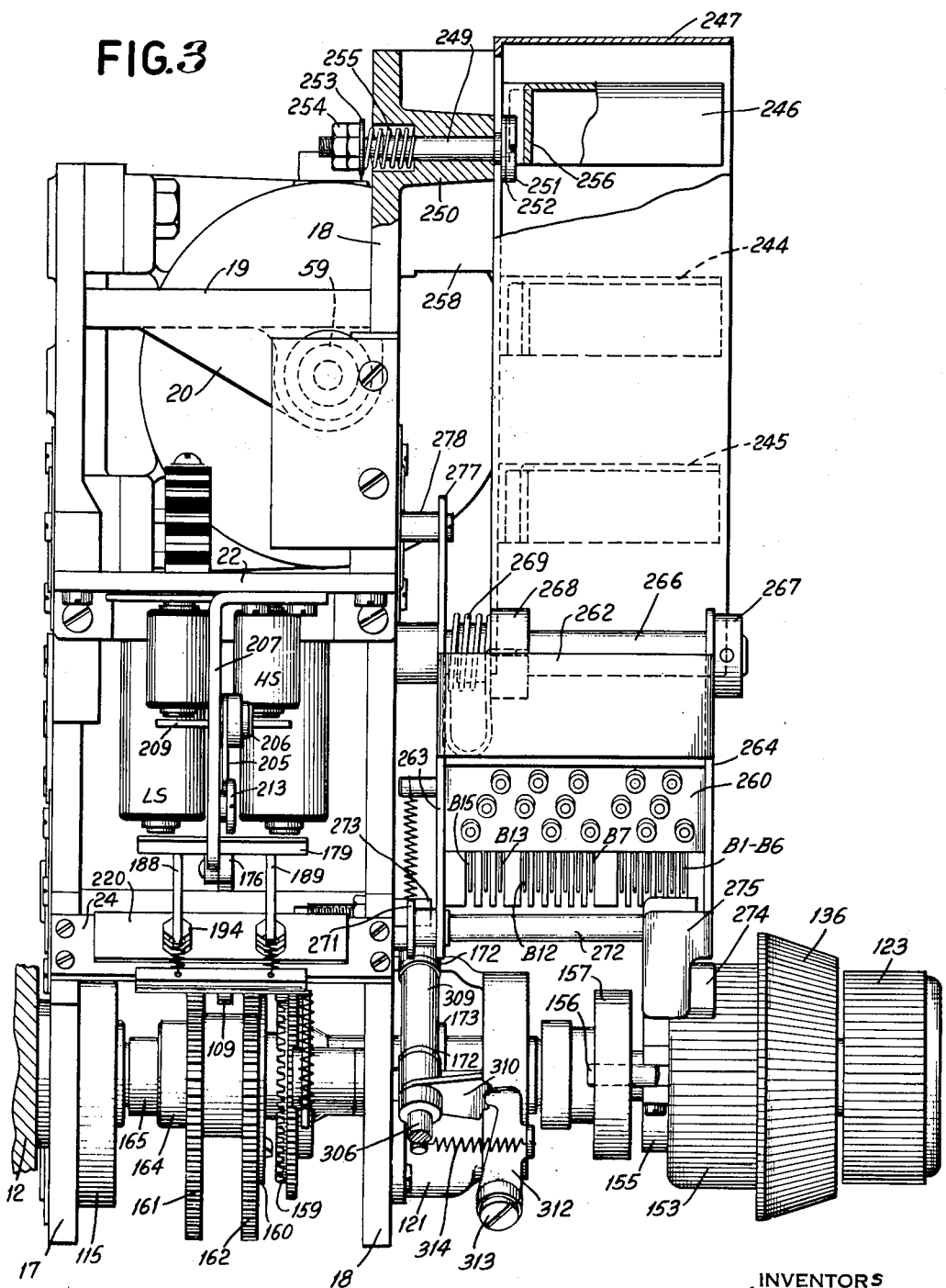

United States Patent Office 2,734,610
Patented Feb. 14, 1956

2,734,610

DRIVE MECHANISM FOR PAPER FEEDING DEVICE

Albert W. Mills, Point Pleasant, N. J., and Frank J. Furman, Endicott, and Edward J. Rabenda, Poughkeepsie, N. Y., assignors to International Business Machines Corporation, New York, N. Y., a corporation of New York Original application August 9, 1945, Serial No. 609,854, now Patent No. 2,531,885. Divided and this application March 11, 1950, Serial No. 149,162

4 Claims. (Cl. 192—145)

This application is a division of our co-pending application, Serial No. 609,854, filed August 9, 1945, for Paper Feeding Devices, and which has eventuated in Patent No. 2,531,885, issued November 28, 1950, and Patent No. 2,615,551, issued October 28, 1952, to which reference may be made for a general understanding of the complete machine.

This invention relates generally to record sheet feeding devices and more specifically to clutching control means for positioning a continuous sheet of forms under control of a perforated tape.

An object of the invention is the provision of a driving mechanism involving the use of high speed and low speed clutches for selective connection to a record sheet platen roller connected to advance in synchronism with a feeding control tape. The clutches are controlled by a pair of magnets which are made effective by relays influenced by the record cards controlling the heading and detail impressions made on the record sheet.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a plan view showing the entire tape control mechanism and the driving extension on the platen shaft.

Fig. 4 is a detail sectional elevation view showing the clutch selection controls.

Fig. 5 is a perspective view showing the mechanism for selecting one or the other of the two sheet advancing clutches.

The feeding controls are illustrated in coordination with a record controlled alphabet printing tabulator. The printing machine is of the kind shown in Patents 2,079,418 and 2,111,122, wherein mechanisms are shown for feeding record cards one by one and analyzing the cards electrically to control the setting of type bars and the accumulation of amounts and total printing of such amounts.

Figure 6:
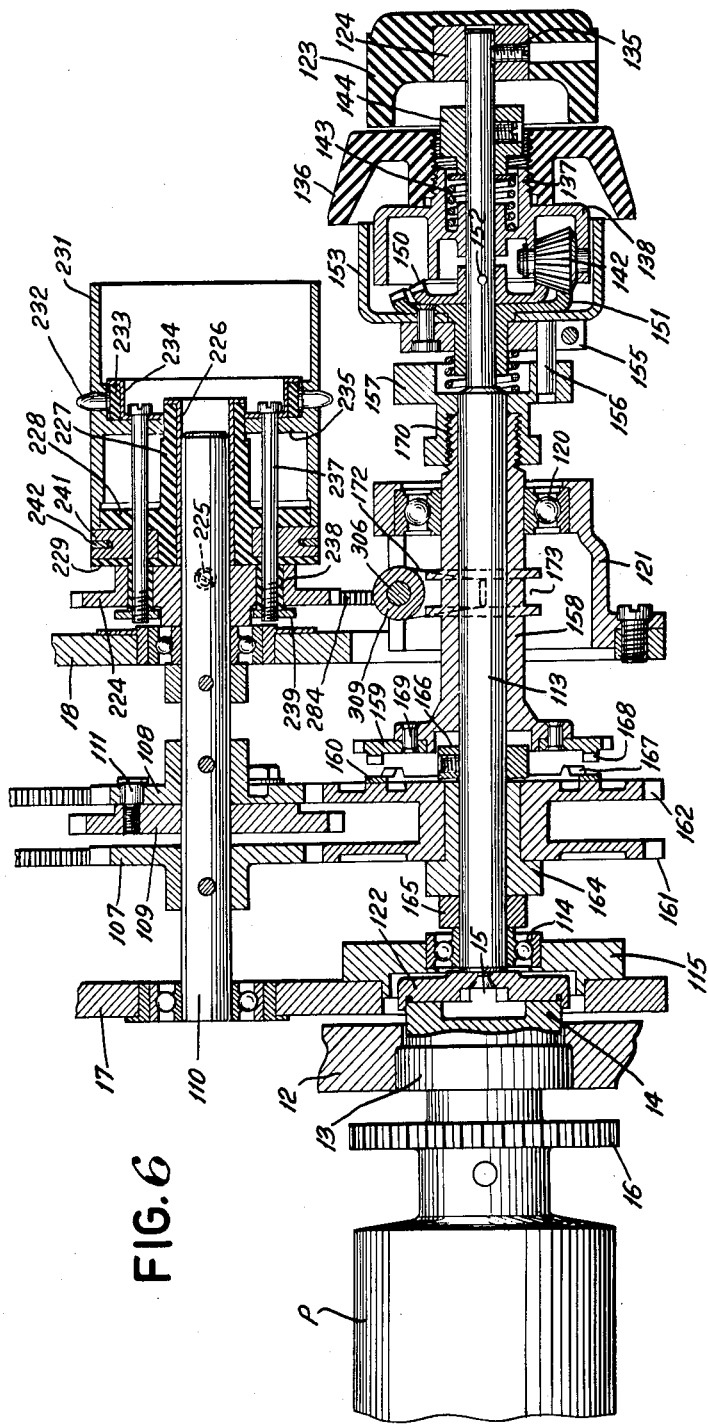
Fig. 6 is a sectional view showing the driving connections between the platen, the driving clutches and the pin wheel for advancing the control tape.

The feeding control unit is hung on the right side frame of the main machine. In Fig. 6 it is seen that this main right side frame 12 carries a ball bearing 13 for supporting a shoulder of a clutch disk 14 fastened to the right end of the platen shaft. The disk is formed with a number of extensions 15 for providing clutch connections between the removable feeding unit and the stationary but rotatable platen mounting.

The feeding controls are supported in the main between a pair of frames 17 and 18, the former being fastened against the outside of the right machine frame 12, and the latter suspended further to the right to carry a platen shaft extension and a tape pin feed wheel. Between the two unit side frames are a number of cross bars tying them together and providing supports for various parts of the control mechanism.

Figure 1:
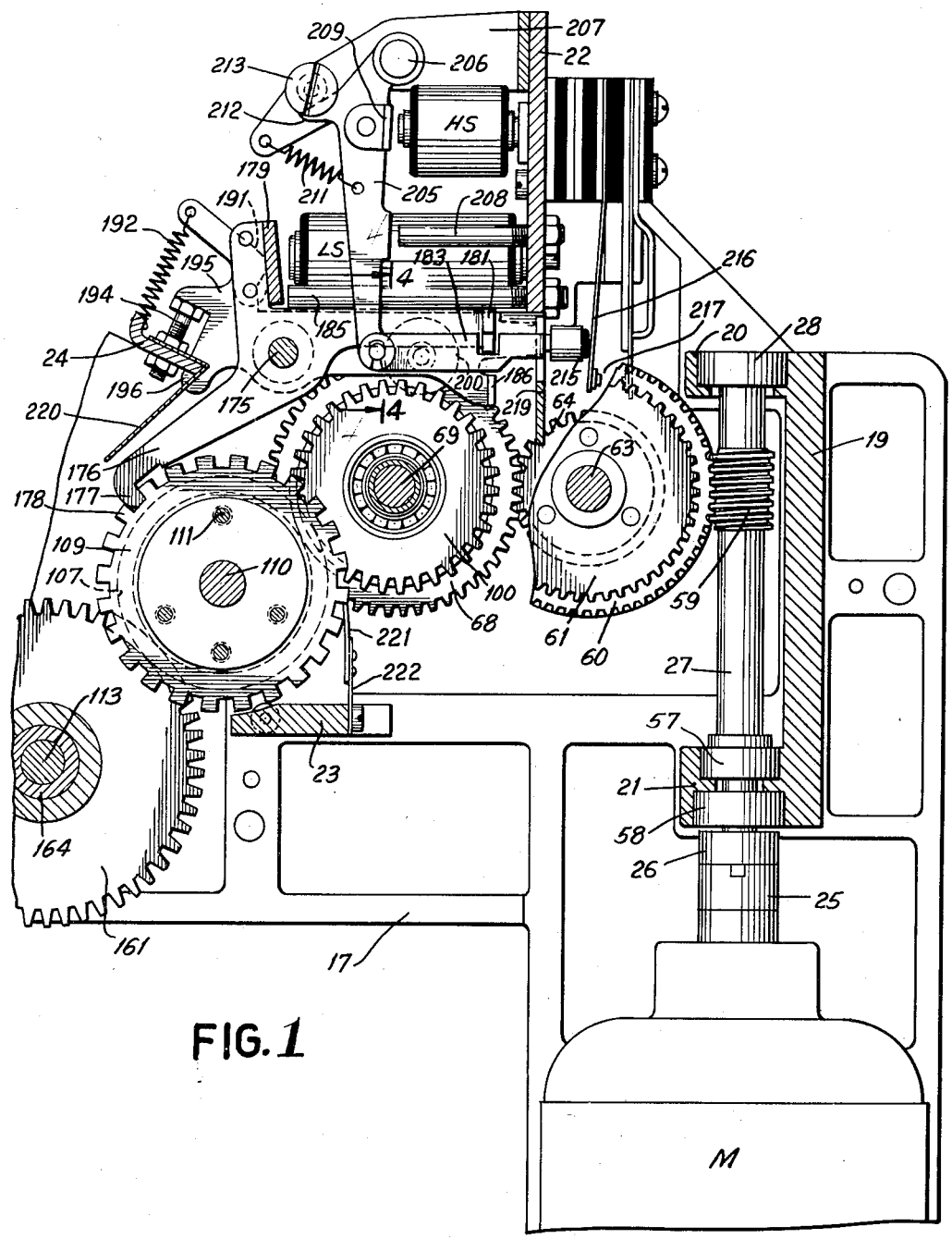
Fig. 1 is a sectional elevation view showing driving connections for the sheet feeding devices.

In Fig. 1 it is seen that a heavy vertical casting 19 is located near the rear of the unit and serves as a tie between the side frames. At the top of the mechanism another tie in the form of plate 22 is secured between the two frames. Near the center of the mechanism, a cross bar 23 serves to tie the two frames 17 and 18 together. A front tie plate 24 also extends across the upper center of the feed unit.

Figure 2:
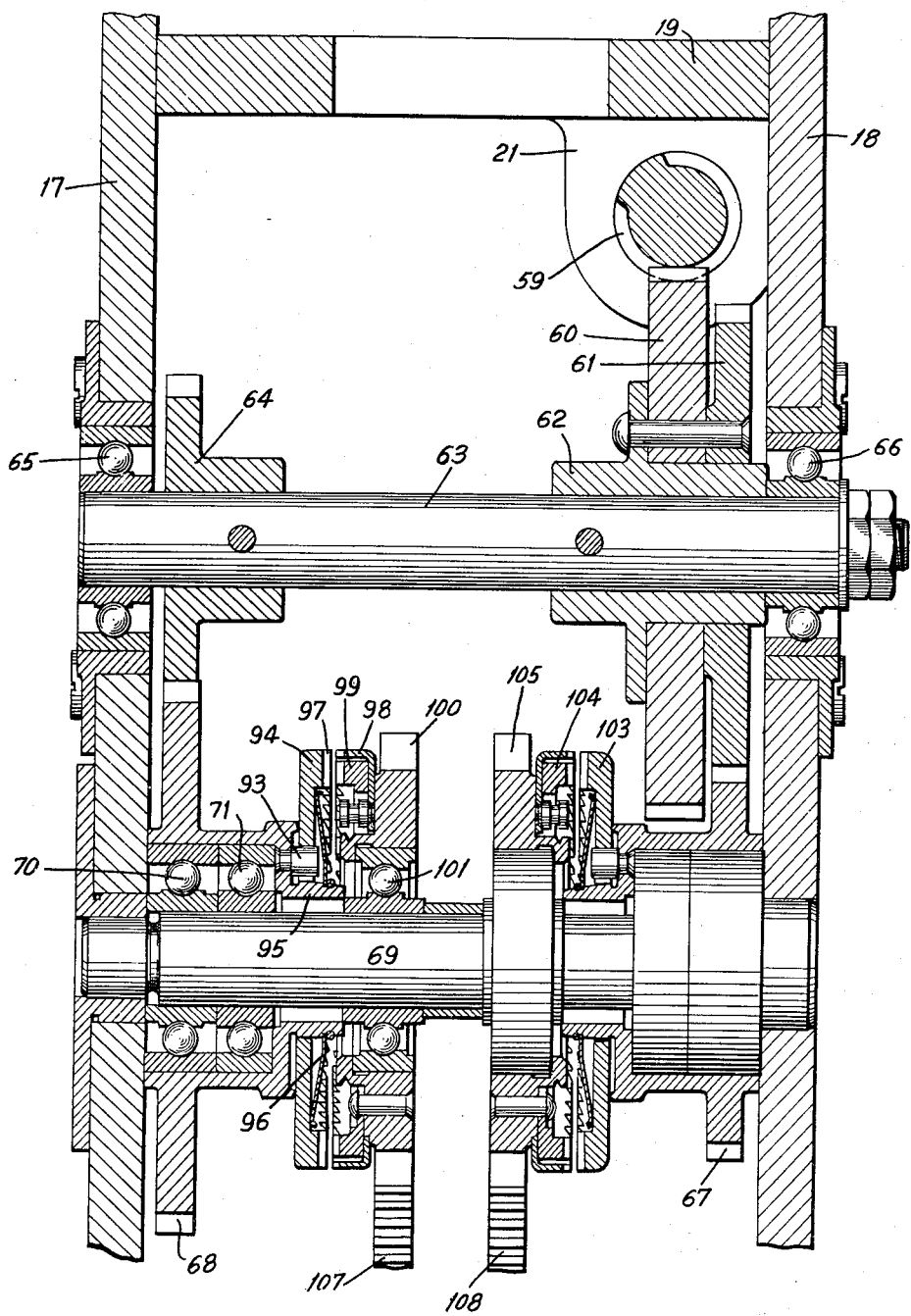
Fig. 2 is a sectional plan view showing the driving connections to a pair of clutches for governing the advancement of the record sheet at low and high speeds.

In Figs. 1 and 2 it is seen that the heavy bracing frame 19 is formed with a pair of ears 20 and 21 for guiding the main drive connections. A motor M (Fig. 1) is fastened to the outer frame 18 in a vertical position and the upper end of its shaft is attached to a flexible coupling 25. This coupling is engaged with a clutch disk 26 fastened to the lower end of a drive shaft 27. Cooperating with shaft 27 is a set of three bearings, one bearing 28 being located in the upper ear 20 and the two lower bearings 57 and 58 being mounted in the lower ear 21, the former being a thrust bearing to take up the pressure provided by the driving worm 59 fastened near the upper end of shaft 27. The motor M and the connected worm drive mechanism is operated continuously and the drive connections therefrom to the clutches are available for instantaneous operation.

Reference to Fig. 2 reveals that the vertical worm 59 is in mesh with a worm wheel 60 fastened along with a gear 61 to a hub 62 attached to a horizontal drive shaft 63. This shaft not only carries the high speed control gear 61 but also has attached thereto a smaller gear 64 for driving connection to a clutch for low speed operation. A pair of ball bearings 65 and 66 are mounted in frames 17 and 18 respectively for guiding the ends of a shaft 63.

Meshing with gears 61 and 64 are a pair of gears 67 and 68 freely mounted on a clutch shaft 69. The gear 68 is the larger of the two to cooperate with the small driving gear 64 for low speed operation. Each of the gears 67 and 68 are provided with a pair of ball bearings, such as 70 and 71, for providing a wide bearing area and a free turning control on the stationary shaft 69. Extending from the outer wall of the hub of gear 68 is a driving pin 93 protruding into a slot cut in the annular clutch disk 94 assembled loosely on a cylindrical shoulder 95 extending from the hub of gear 68. Although this clutch disk 94 is loosely arranged on the end of the gear, it is held against the gear by a spider spring 96 fastened to the shoulder 95 and having spring fingers pressing disk 94 against the side of the gear hub. Disk 94 is formed with an annular ring of driving teeth 97 normally separated from matching teeth on a clutch shroud 98 and a driving ring 99 fastened to a driven gear 100 also loosely mounted on shaft 69 and supported thereon by a bearing 101. Gear 100 is normally held from rotation by a locking disk to be described hereinafter, and the driving connection is established by tipping disk 94 with reference to gear 68. When the upper end of disk 94 is tilted or tipped as already mentioned, the spider spring yields in that particular direction and the teeth on the opposing clutch members mesh to provide a driving connection.

The other gear 67 is also provided with a clutch driving disk 103 and a driven disk 104 attached to a gear 105. Since the constructional details of both clutches are similar, it is unnecessary to mention the details of the clutch at the right.

Cooperating with gears 100 and 105 are a pair of intermediate gears 107 and 108 (Fig. 6) mounted with a locking disk 109 on a shaft 110 which passes through bearings in both side frames and extends beyond the outer side frame 18 and there it supports the tape driving drum.

The two clutches shown in Fig. 2 are used for different kinds of control in advancing the record sheet. The low speed clutch including driving disk 94 is used most of the time and is called into operation for line spacing and overflow skipping. The other clutch including disk 103 shown at the right and comprising high speed gearing is called into operation as an incident to the printing of totals. A pair of magnets is used to operate camming mechanism for closing one or the other of the two clutches. But, before describing the details of the means for operating the clutches, it is believed best to follow the driving connections from the clutches to the platen.

It is already mentioned that a locking disk 109 (Figs. 1 and 6) is mounted on shaft 110 and situated between the two intermediate drive gears 107 and 108. This locking disk is fastened to the gear 108 by means of a series of headed screws such as the screw 111.

The platen shaft extension

The driving connections are not direct from the clutches to the platen shaft. Instead, a platen shaft extension is provided to carry adjustment and vernier regulating knobs as platen controls removable along with the entire feed control unit. Not only is the entire platen extension removable, but within the unit is a clutch connection making it possible to disconnect the tape feed control so that the sheet feeding operation may revert directly to the ordinary tabulating line space and total space regulating devices.

Referring to Fig. 6, it is seen that the extension shaft 113 extends to the right of the platen clutch 14 and is supported by bearing arrangements in the two feed unit frames 17 and 18. The left end of extension shaft 113 is supported by the ball bearing 114 centered in an annular ring or collar 115 fastened in a circular opening near the bottom of the frame 17. The middle of shaft 113 is supported by another ball bearing 120 fixed in a hollow bearing cup 121 fastened to the outer side of frame 18. Fixed to the left end of shaft 113 is a coupling disk 122 shaped with an annular flange which embraces the periphery of the locking disk 14 fastened to the stationary platen shaft. Coupling 122 is shaped with notches to coincide with the extensions 15 formed on the clutch member 14, thereby providing a driving connection between the stationary part of platen and the removable unit with extension shaft 113.

At the right end of extension shaft 113 is fastened the platen adjustment knob 123 formed with a metallic center 124 carrying a set screw 135 for securing the knob to the shaft. This knurled knob 123 is used for line space adjustment of the platen and long feed movement in graduations greater than line space movements. Alongside knob 123 is another knurled knob 136 provided to regulate adjustments to a fine degree through a vernier mechanism which is used to select the exact location of printed matter with respect to definite recording spaces on the record forms. A motion of vernier knob 136 is not communicated directly to the extension shaft but passes through bevel gearing, making possible a relatively fine movement of the shaft for a comparatively large movement of the knob.

The inside of vernier knob 136 is threaded to provide means for connecting it to the threaded shoulder 137 formed on the cup-shaped driving member 138 loosely mounted on shaft 113. Member 138 is formed with a pair of flanges or annular rings between which is loosely pivoted a bevel pinion 142. Member 138 is formed on the threaded side with an annular groove in which there is pressed a coil spring 143 tending to hold the bevel pinion in operation. As a means for backing up the spring 143, a collar 144 is fastened to shaft 113 by a set screw.

Cooperating with bevel pinion 142 is a pair of bevel gears 150 and 151, the former being pinned directly to shaft 113 by pin 152 and the latter attached to the inside of the cup-shaped shroud 153. Also attached to the shroud 153 and located on the outer surface thereof is a driving pin holder 155 carrying a pin 156 through which the driving force from the clutches mentioned hereinbefore is communicated to the platen. Pin 156 projects into an opening formed in the wall of a sliding bushing 157 threaded on one end of a long sleeve 158 carrying a clutch disk 159 cooperating with another clutch disk 160 fastened to the side of a unitary arrangement of a pair of gears 161 and 162 meshing with the intermediate gears 107 and 108 already described. It will be remembered that gears 107 and 108 communicate the driving action from the low speed and high speed feed control clutches. The operation of driving from either feed clutch is communicated down to the gears 161 and 162 and from that point on it is optional whether the drive is to be communicated to the platen, depending on the axial position of the sleeve 158 to engage or disengage clutch 159, 160.

Returning again to the explanation of how the vernier knob operates through the bevel gear, it is noted that when the sliding connection comprising pin 156 is fixed because of connection to the feed control clutches, then the outer bevel gear 151 is fixed relative to the inner bevel gear 150 which is fastened to the platen extension. With the outer gear fixed and the pinion rotated in a planetary fashion about the shaft center, then the inner gear with a smaller number of teeth is advanced slightly relative to the fixed parts and a fine adjustment of the platen is made possible.

When the driving action comes through the clutch sleeve 158 from the feed control clutches, then the outer bevel gear 151 becomes the driver and the bevel pinion 142 merely serves as a connection to the inner bevel gear 150 which connects directly to the extension shaft 113 and the platen P.

Returning to consideration of the drive from the feed control clutches, it is noted that the gear unit comprising gears 161 and 162 is fixed to a bushing 164 loosely mounted on shaft 113. The bushing is confined between a pair of fixed collars 165 and 166, the former taking up the thrust produced when the clutch connection 159, 160 is established. The stationary part of the clutch connection is the ring 160 fastened to the side of gear 162 and provided with a series of teeth 167 extending toward the teeth 168 formed on the side of the clutch disk 159 fastened to a flange on sleeve 158 by a series of rivets 169. At the right end of sleeve 158, the driving bushing 157 is attached to the sleeve by being screwed on the threads of a reduced extension 170.

The position of the connecting sleeve 158 is regulated by a manipulative control ending in an arm 172 having an extension fitted in a circular groove 173 between a pair of flanges formed on sleeve 158. However, before considering all details of the manipulative control, it is believed best to consider first the means for controlling the low speed and high speed clutches and effecting the driving motions already described.

Referring to Figs. 1, 4 and 5, it is seen that a pair of magnets HS and LS control a set of camming mechanisms for operating one or the other of the two clutches. If magnet LS (Fig. 1) is operated alone, it is a sign that the low speed clutch is to be operated to drive the platen connections to advance the record sheet for line spacing or overflow movements. When the other smaller magnet HS is energized slightly before the magnet LS, it is an indication that the connections are to be varied so that a high speed clutch is closed to advance the platen and the record sheet as an incident to a total printing operation.

In Fig. 1 it is seen that the large magnet LS is mounted on the cross plate 22 and that the other magnet HS is also mounted thereon directly above it.

Extending across the unit between the side frames 17 and 18 is a shaft 175 which acts as a pivot for a locking or detenting lever 176 having a hooked end 177 for cooperating with the teeth 178 formed around the periphery of the locking disk 109. Lever 176 not only serves to perform the function of keeping the drive gearing locked in a normal condition, but it is also formed with two other extending arms, one of which carries the armature 179 located opposite the pole pieces of the low speed control magnet LS. The third arm 180 (Fig. 5) extends toward the rear of the machine and carries a cross bar 181 which is used to operate the camming mechanism for throwing one or the other of the two clutches into an operated condition. Cross bar 181 does not act directly on the clutch shifting parts but instead it works through a pair of interposer slides 182 and 183. In Fig. 5 it is seen that the left slide 182 is so shaped that the top surface thereon abuts against the underside of one end of bar 181 while, on the other hand, the notch 184 in the other slide 183 is normally presented under the opposite end of bar 181. Underlying the slides 182 and 183 are offset lugs 186 and 187, the former being part of an operating lever 188 for the low speed clutch and the latter being formed on a lever 189 which is provided to cam the clutch for the high speed train of connections. Both levers 188 and 189 are loosely pivoted on shaft 175 and extend forwardly and have raised elbows 190, 191 for abutting against the front face of the armature piece 179. A pair of springs 192 (Fig. 1) are connected between the extending ends of the levers and the cross bar 24. They tend to rock the levers 188 and 189 in a counterclockwise direction which is the opposite of the direction for producing a clutch closing motion. Extending upwardly from plate 24 is a pair of bolts 194, the heads of which serve as adjustable stops for extensions 195 formed on the front of the operating levers. In order to guide the front ends of the operating levers, the cross bar 24 is formed with notches for confining dependent extensions 196 formed on the lower part of the front ends.

In Figs. 4 and 5, it is seen that the operating levers 188 and 189 are provided with outwardly extending studs 198 and 199 for carrying camming disks 200 and 201. The cam disks are loosely mounted on the studs for rotatable movement, but they are closely confined to prevent end play. Disk 200 (Fig. 4) is situated so that the slanted cam surface thereon cooperates with the outer rounded periphery of the movable clutch disk 94 forming part of the low speed drive. The other cam disk 201 mounted on lever 189 is somewhat similarly located with respect to the other clutch connecting disk 103 which is part of the high speed drive. It is noted that the slanted cam surfaces of the two clutch disks face in opposite directions because the closing motion for the low speed clutch is toward the right while the closing motion needed for operating the high speed clutch is toward the left.

Before pointing out how the parts are operated to engage one or the other clutches, it is believed well to explain how the interposer slides 182 and 183 (Fig. 5) are shifted to set the mechanism in two different ways. In Fig. 5 it is seen that both arm 203 which is pivotally connected to a slide 182 and arm 204 which is pivotally connected to slide 183, are slanted upward toward a common point and joined with an armature lever 205 pivoted at 206 (Fig. 1). This pivot is provided on a bracket 207 attached to the vertical plate 22 already mentioned as one of the connecting parts between the frames.

Extending from plate 22 is an adjustable pin 208 which serves as a stop for the armature lever 205. Attached to lever 205 is a cross piece 209 serving as an armature in cooperation with the pole pieces of the interposer magnet HS which is operated for high speed purposes. A spring 211 tends to draw the lever 205 in a clockwise direction so that an extension 212 thereon abuts against a stop stud 213. When lever 205 is in the normal position, the slides 182 and 183 are located as shown in Fig. 5 with the first mentioned slide in position to be operated and the second slide presenting the notch 184 which makes it free from operating control.

Extending from the left slide 182 is an insulated button 215 (Fig. 1) abutting against a flexible contact blade 216 forming one side of a pair of contacts 217. These contact blades are mounted between insulation blocks secured to the rear surface of cross plate 22. Attached to the bottom edge of the plate 22 is a notched comb 219 which acts as a guiding means and prevents side play of the interposer slides and the operating levers 188 and 189 which are formed with rearwardly extending portions.

Assuming that the parts are in the normal position and that the low speed magnet LS is the only one energized, then the armature 179 (Fig. 1) is attracted and the operating lever 176 is rocked in a clockwise direction until stopped by pin 185. This motion serves first to disengage the locking tooth 177 to permit free rotation of the gearing drive. At the same time the cross bar 181 (Fig. 5) is lowered and carries down before it the cooperating interposer slide 182 and this in turn depresses the lug 186 on the left hand operating lever 188. Since this lever carries the camming disk 200, it operates to shift the clutch disk 94 (Fig. 4) toward the right and engage the low speed clutch with the constantly operating part of the gearing. In this way operation of the magnet LS alone causes advance of the record sheet as driven by the low speed gearing.

When lever 176 (Fig. 1) is rocked clockwise by energization of the magnet, it comes into contact with a leaf spring 220 fastened on bar 24. This spring tends to restore the lever to the normally disengaged position which is assumed when the magnet becomes deenergized. The hooked end 177 of lever 176 is tapered to find its way between teeth 178 so that the stopping wheel 109 can be brought to a definite locked position. Cooperating with the opposite side of the locking disk is an overthrow preventer in the form of a blade 221 mounted on a spring 222 fastened to the rear of the cross bar 23. Upon the passage of each tooth 178 in a counterclockwise direction, blade 221 snaps in behind the tooth and prevents retrograde movement.

Assuming that the gearing is to be connected for a high speed operation, then the interposer magnet HS (Fig. 1) is energized first and serves to rock lever 205 in a counterclockwise direction and shift the two slides 182, 183 (Fig. 5) so that the former presents a relieved portion under the left end of cross bar 181 and the latter is shifted rearwardly so that the notch 184 is carried away from the under side of the right end of cross bar 181. With slide 183 in an abutting position between cross bar 181 and the lug 187 on lever 189, then upon energization of the other magnet LS and consequent clockwise operation of lever 176, downward movement of the connected bar 181 is communicated through slide 183 to lug 187 and serves to rock lever 189 in a clockwise direction. Since this operating lever 189 is the one carrying camming disk 201 associated with the high speed disk 103 (Fig. 4), the high speed clutch is closed and the driving connections are established from the motor through the high speed drive to the platen.

As an incident to the shifting of the interposer slide 182 (Fig. 1), contacts 217 are closed to provide circuit connections to call in magnet LS directly after energization of magnet HS as described in detail hereinafter.

Provisions are made to advance the control tape TP in synchronism with the movement of the record sheet by means of gearing connections from the two clutches described hereinbefore. The point at which the two drives are connected is shown in Fig. 6, where it is seen that the intermediate gear shaft 110 extends to the right of the outer frame 18 and carries a tape feeding pin wheel.

It is noted from the position of the declutching lever shaft 306 (Fig. 3) that, when it is rocked clockwise to the "in" position, arms 172 are depressed and rocked in the direction observed as clockwise in Fig. 6. This movement tends to shove the sleeve 158 toward the left and engage the clutch disk 159 with the driving ring 160.

When the declutching lever is rocked to the "out" position, the train of connections is moved in the opposite direction and shaft 306 (Fig. 6) is rocked counterclockwise to push the sleeve 158 toward the right and disconnect the connections between the feed control clutches and the platen.

In order to maintain the position in which the declutching lever is set (Fig. 3), a detenting device is provided. Attached to shaft 306 is an arm 310 formed with a pair of notches. Cooperating with the notched surfaces is a pointed detent 312 pivoted on a stud 313 extending from the side of the bearing frame 121. A spring 314 is connected to the detent and tends to rock it counterclockwise to hold the pointed end in engagement with the notched surface of arm 310 and thereby hold the declutching lever in one of the two possible selection positions.

The electrical controls

Figure 7:
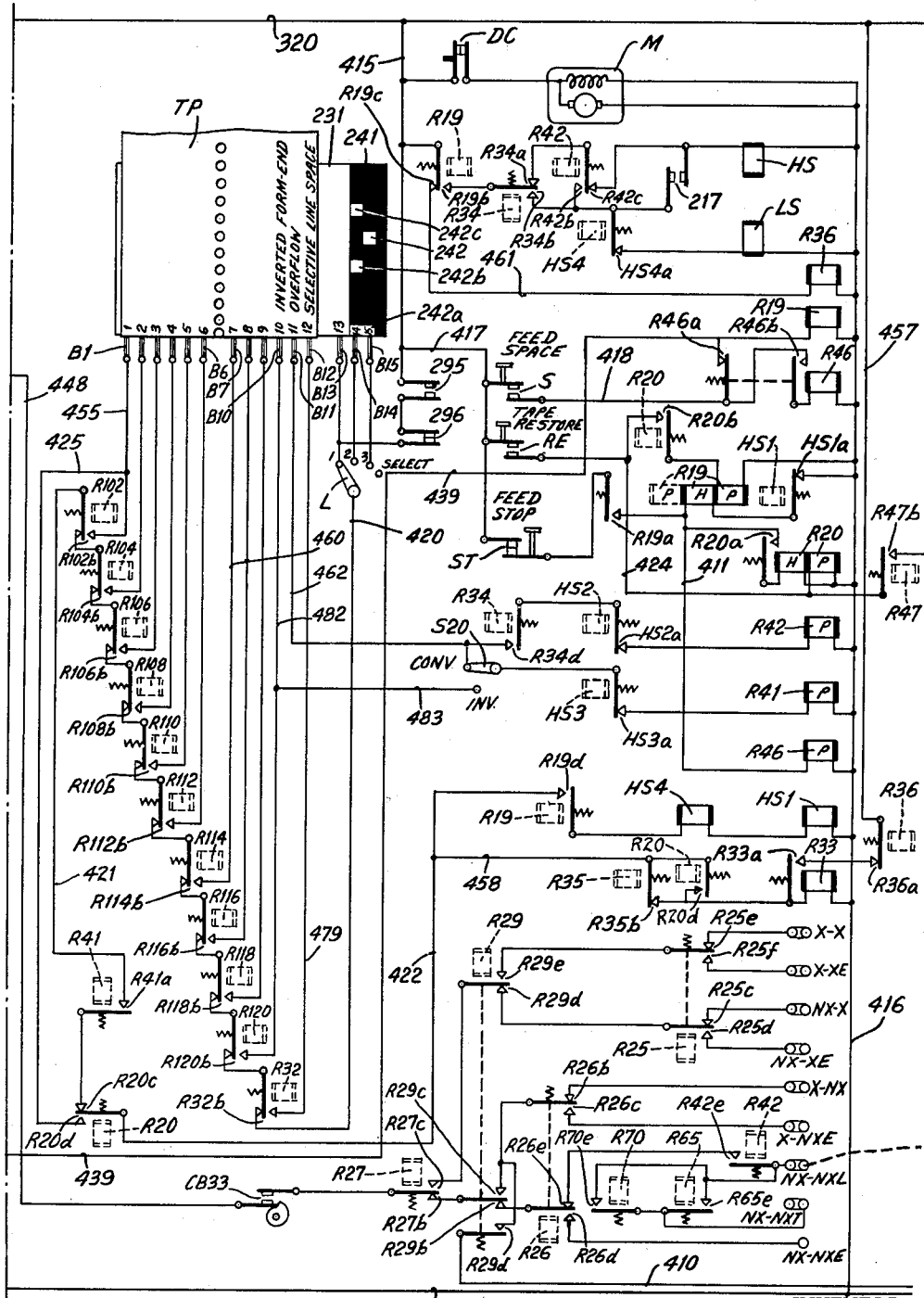
Fig. 7 is a portion of the wiring diagram of the machine.

As shown in the wiring diagram, Fig. 7, the magnet controls for the clutches are coordinated with the controls of the tape sensing devices and a printing tabulator. This is explained in detail in the parent case, Serial No. 609,854, filed on August 9, 1945, and now Patent No. 2,531,885 of which the present case is a division. For present purposes, it is sufficient to note the controls for the pair of clutches involving magnets HS and LS which govern spacing.

Associated with motor M, Fig. 7 are the two clutches described hereinbefore, the one being controlled by the low speed magnet LS which is energized alone for line spacing and overflow skipping, and the other clutch is called in by magnet LS and the high speed interposer magnet HS which is energized to clutch other gearing to skip upon the printing of a total.

Also shown on Fig. 7 is a diagrammatic representation of the pin feed drum 231 holding the control tape TP with the commutator 241 extending to control line spacing in addition to the other spacing controls exercised by the feed control indicia in the tape in association with the fifteen sensing brushes B1 to B15.

Tape drum and commutator adjustment

The tape feed spacing key S, Fig. 7, may be used for properly setting the tape control commutator when setting the record feed devices for a new form under control of an inserted tape TP. If single line spacing is to be used, i. e. with switch L set to "1", the control tape may be set on the feeding pins without regard to the synchronism between the tape and the commutator. However, if the required line spacing is to be doubled or tripled, the switch L should be set to 2 or 3 and and the brushes brought down to bear on the commutator and the space key S depressed. Then a circuit will be set up through line 320, wire 415, wire 417, contacts S, wire 418, interlock contacts R46a, pickup coil of relay R19, wire 416, line 321. Relay R19 then serves to close contacts R19b in series with the low speed clutch magnet LS and the commutator 241 is rotated and brought to a stop when one of the commutator spots is encountered by brush B14 or B15.

Assuming that the triple space selection is made, then when brush B15 encounters the spot 242, the stopping circuit will be established as follows: from line 320, to wire 415, circuit breakers 295, 296, common brush B13, the conductive drum 231, spot 242, brush B15, switch L, wire 420, normally closed contacts R32b, the series of brush selection contacts R120b to R102b, wire 421, relay contacts R41a, relay contacts R20c, wire 422, relay contacts R19d, control relays HS4 and HS1, wire 416, line 321. Control relay HS4 then operates to open contacts HS4a in series with the clutch magnet LS to disable it and stop the rotation of the commutator with the control spot 242 just beyond the line of brushes. Then the brushes can be raised and the tape inserted, so that the restoration perforation is just beyond the brush B1.

Interlock relay R46 is energized by relay R19 to open contacts R46a and prevent the key contacts S from prolonging any feed operation. When contacts R19a are closed by any feed selection operation of relay R19, a circuit is set up through the pickup coil of relay R46. The circuit includes line 320, wires 415 and 417, stop key contacts ST, relay contacts R19a, wire 411, coil R46, wire 416 and line 321. Relay R46 then opens contacts R46a to break the key operated feed circuit, and it also closes contacts R46b to prepare a holding circuit should the feed space key be held down. As long as feeding is in progress, contacts R46a are held open, and should the key contacts S be closed, the interlock circuit is held through wire 418 and contacts R46b until the key is released.

Once the tape is synchronized with the commutator setting as already described, it can be brought around to the starting position by operation of the restoring key RE.

Tape restoration control

There are times when the tape remains out of the normal starting position after recording has taken place under control of one batch of cards. Prior to the initiation of recording under control of another sequence of record cards, it is desirable to restore the tape to the normal starting position. To effect such control, the tape restoration key RE is depressed and a number of circuit connections are established for operating the clutch magnet LS to cause movement of the tape until the brush B1 encounters the initial tape perforation 1t at the starting position.

The restoration circuit is established by the closure of key contacts RE, Fig. 7, and the connections include line 320, wires 415, 417, contacts RE, wire 424, the pickup coil of relay R20, and wire 416 to line 321. Relay R20 then closes contacts R20b to set up a circuit through a pickup coil of relay R19. Relay R19 then closes associated contacts R19a to set up holding circuits for both relays R19 and R20 through the stop contacts ST. The holding circuits for relay R19 include line 320, wire 415, 417, stop contacts ST, relay contacts R19a, holding coil of relay R19, relay contacts HS1a and wire 416 to line 321. Through somewhat similar connections and closure of contacts R20a, the holding coil of relay R20 is also energized. When the holding coil of R19 becomes effective, it acts to close contacts R19b so that the low speed clutch magnet LS is operated as follows: line 320, wire 415, contacts R19b, normally closed lower contacts R34b, normally closed contacts HS4a, magnet LS and wire 416 to line 321. The operation of the clutch magnet causes the feed connections to be established to the pin feed wheel so that the tape is advanced.

The tape is moved until the initial feed control perforation is encountered by the first sensing brush B1, and then a tape stopping circuit is established through the brush to hold the tape at the starting position. The circuit may be followed from line 320, through wire 415, circuit breakers 295, 296, common brush B13, through the conductive drum 231 and the hole 1t in the tape TP to brush B1, through wires 455 and 425, lower contacts R20d now closed by relay R20, wire 422, contacts R19d, relays HS4 and HS1, wire 416 and line 321. Relay HS4 then operates to open the contacts HS4a already mentioned as being in series with the clutch magnet LS and, when these contacts open, the clutch magnet is deenergized to terminate the tape feed.

The other control relay HS1 operates to open the contacts HS1a already mentioned as being in series with the holding coil of relay R19 and, when they are opened, both relays R19 and R20 are deenergized. Control relays HS1 and HS4 are deenergized by the opening of circuit breakers 295 and 296 which operate by the time that the platen clutch is latched upon the termination of the advancement of the tape.

As the restoration movement of the tape is taking place, the overflow control perforation is used to set up the relay R41 which closes contacts R41a in series with all of the tape brush relay contacts. The circuit for picking up relay R41 is made up with line 320, wire 415, breaker contacts 295, 296, common brush B13, cylinder 231, through the overflow control perforation in tape TP, brush B11, wire 462, switch S20, relay contacts HS3a, the pickup coil of relay R41, wire 416 and line 321.

Brush B13 is used at all times as a common contact member in association with a conductive part of the tape carrying drum 231. It conveys impulses for all tape feeding control, in addition to the use for single line spacing control.

*Line spacing control*

As an accompaniment to every printing operation, it is desired to effect controls for line spacing the record strip and also for advancing the control tape to move in synchronism therewith. On every printing operation the PM cam contacts are operated and certain of these are devoted to control for line spacing in series with wiring leading to the pickup coil of relay R19, which, it will be remembered, controls selection of the low speed clutch magnet LS. These three PM cam contacts are timed differently to control the time that the line spacing operation takes place with respect to printing. The PM11 cam contacts are closed at a time while the type bars are moving upward and thereby cause an advance of the platen before printing takes place. Therefore, spacing which is controlled by the PM11 cam contacts is referred to as upstroke spacing. The other two cam contacts PM10 and PM12 are timed to close when the type bars are moving downward after printing has taken place. The spacing accompanying control by contacts PM10 is referred to as downstroke spacing accompanying the restoration of the printing bars. Contacts PM12 are used for space skipping and are effective whenever a tape brush is selected for what is usually a plural line movement of predetermined length.

The operation of line spacing is not only affected by the timing of the PM cams but it is also influenced by the setting of a switch for listing or tabulating operation. When the switch is set for listing control there is an upstroke spacing operation on every listing cycle and on every totaling cycle. For final total cycles there is an upstroke spacing operation for the first and second total printing cycles.

When the switch is set for tabulating control there is an upstroke spacing operation on group indication cycles and also on intermediate and major total printing cycles. For final total control when set for tabulating there is upstroke spacing control for the first and second total cycles.

Downstroke spacing accompanies every total taking cycle when the switch is set for listing. When the switch is set for tabulating there is a downstroke spacing operation after every major total recording, and upon the printing of final totals there is a downstroke space after the second total cycle.

The timing of the line space control impulses is made accurate with respect to the tape feed because the circuit breaker wheels are geared directly to the tape feeding drum 231 and proportioned to turn one revolution for each cycle of the pin feed. The wheels have teeth for operating the breaker contacts 295, 296 to close 24 times in each cycle of operation of the tape feed wheel and commutator cylinder 241, Fig. 7. When operating for single line spacing, the impulse through contacts 295 and 296 is used directly to terminate spacing. For multiple line spacing, the second or third closure of contacts 295 and 296 creates an impulse passing through the commutator segments 242c or 242 to stop the feed platen after two or three line spaces of movement. For space skipping, when the length of feed is determined by the location of a perforation in the tape TP, circuit breakers 295 and 296 also govern the time that the impulse is sent through the tape brush, for they are adjusted to close after each possible perforation position is at the brush line and thereby prevent sparking at the tape.

The common commutator segment 242a is normally positioned to be slightly advanced beyond the brushes B14 and B15, so that when feeding is initiated they make no contact until segments 242c or 242 are encountered.

*Line spacing—upstroke*

Whenever a group indication or listing cycle is taken, a circuit is initiated to start the platen moving for line spacing.

Relay R19 then closes contacts R19b in series with the low speed clutch magnet LS. The circuit for starting the rotation of the platen follows a path through line 320, wire 415, contacts R19b, lower contacts R34b closed as soon as the feed unit is made effective, normally closed contacts HS4a, magnet LS and wire 416 to line 321.

After the platen has been turned through an arc equal to one line space, the circuit breakers 295 and 296 close to send an impulse through relays for disabling the clutch magnet LS. The line spacing stop circuit is as follows: line 320, wire 415, circuit breakers 295 and 296, switch L set to select single spacing, wire 420, the normally closed left contacts R32b, the normally closed series of brush relay contacts R102b to R120b inclusive, wire 421, normally closed relay contacts R41a and R20c, wire 422, relay contacts R19d, control relays HS4 and HS1, and wire 416 to line 321. Relay HS4 acts to terminate the line spacing operation by opening the contacts HS4a in series with the clutch magnet LS. The spacing control relay R19 is also deenergized by the operation of relay HS1 which opens contacts HS1a in series with relay R19.

Referring to Fig. 1, it is seen that the operation of line spacing is made definite with regard to location of the record strip by operation of the detenting lever 176 which is coordinated with the energization and deenergization of clutch magnet LS, so that the pointed end 177 of the lever cooperates with the teeth 178 of the locating wheel 109, which is geared directly to the platen shaft.

When the switch L (Fig. 7) is set to select a double spacing operation, the stopping circuit is almost the same as that already traced for stopping after single line advancement, the only difference being that the impulse from the circuit breakers is directed through brush B13 and through the conductive feeding drum 231 and over to one of the commutator spots 242c which cooperates with the brush B14 after a movement equal to two spaces. The circuit continues through the brush B14 down to the second switch terminal now engaged by lever L and then continues through the wire 420 and over to the high speed interrupting relays HS4 and HS1 as explained in the foregoing discussion of line space stopping.

When the connections are established for triple spacing, the stopping circuit is the same as that for double spacing with the exception that the brush B15 is switched into the stopping circuit and is effective when encountering a commutator spot 242 which is spaced around the periphery of the commutator at distances equivalent to movement of three line spaces on the strip.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a clutching mechanism with driving and driven devices, a pair of low and high speed clutches therefor, separate operating members for the clutches, a magnet for controlling operation of said members, an armature frame cooperating with said magnet, a second magnet for selecting high speed operation, a second armature frame cooperating with said second magnet, interposing means placed between said clutch operating members and the first mentioned armature frame to control selective mechanical connection between the frame and either one of the members, said interposing means being selectively positioned by said second frame to effect such selective connection and being operated by said first mentioned armature frame to operate the selected one of said members and thus selectively operate one of said clutches, and means for energizing either the first mentioned magnet or both magnets, whereby operation of the first mentioned magnet causes operation of one clutch for low speed operation and operation of both magnets causes selection and operation of the other clutch for high speed operation.

2. The combination set forth in claim 1 wherein said interposing means comprises a pair of notched slides overlying said separate clutch operating members, and wherein the first mentioned armature frame includes a cross bar which overlies said slides and normally registers with a notch in one of the slides while operating the other through an unnotched portion thereof to selectively operate a related one of said clutch operating members, whereby operation of said interposing means causes a shift in said slides to move the notch of the normally inoperative slide away from under the cross bar and permits operation thereof.

3. In a clutching mechanism with driving and driven devices, a pair of clutches therefor, separate operating members for the clutches, a magnet for controlling operation of said members, an armature frame cooperating with said magnet, a second magnet for selecting the operation of said members, a second armature frame cooperating with said second magnet, interposing means placed between said clutch operating members and the first mentioned armature frame to control selective mechanical connection between the frame and either one of the members, said interposing means being selectively positioned by said second frame to effect such selective connection and being operated by said first mentioned armature frame to operate the selected one of said members and thus selectively operate one of said clutches, and means for energizing either the first mentioned magnet or both magnets, whereby operation of the first mentioned magnet causes operation of one clutch and operation of both magnets causes selection and operation of the other clutch, said driven device having a notched member geared thereto, and a detenting means operated by the first mentioned armature frame to cooperate with said notched member to hold the driven means as soon as the first mentioned magnet releases an operated member to declutch an operated clutch.

4. In a record feeding device, a platen, a driving means, high and low speed clutches between said platen and said driving means, each of said clutches including an axially shiftable member to engage the respective clutch, a pair of cam members cooperating separately with said shiftable clutch members, high and low speed control magnets, an armature for said low speed magnet, an operating frame on said armature and common to both said cam members, an armature for said high speed magnet, a notched interposer frame on said high speed armature and shifted thereby to be variably interposed between said operating frame and said pair of cam members so that unnotched parts of said interposer frame selectively wedge between said operating frame and either of said cam members, and means for energizing the low speed magnet alone for slow feeding and energizing both magnets together for high speed feeding, whereby the slow speed cam member is operated by the operating frame through an unnotched part of the interposer frame when the low speed magnet alone is energized, and when the high speed magnet is energized its armature and the interposer frame thereon is shifted so that an unnotched part of the interposer frame is brought between the operating frame and the high speed cam member so that when the operating frame is operated by the low speed magnet and related armature the high speed cam member is effective for high speed clutching when both magnets are energized.

References Cited in the file of this patent

UNITED STATES PATENTS

| 2,222,913 | Pescara | Nov. 26, 1940 |
| 2,314,258 | Watson | Mar. 16, 1943 |

FOREIGN PATENTS

| 847,887 | France | Oct. 18, 1939 |